United States Patent
Andersson

[11] Patent Number: 6,040,871
[45] Date of Patent: Mar. 21, 2000

[54] METHOD AND APPARATUS FOR SYNCHRONIZING VIDEO SIGNALS

[75] Inventor: Russell L. Andersson, Manalapan, N.J.

[73] Assignee: Lucent Technologies Inc., Murray Hill, N.J.

[21] Appl. No.: 08/777,339

[22] Filed: Dec. 27, 1996

[51] Int. Cl.[7] .............................. H04N 9/475; H04N 7/01; H04N 5/445

[52] U.S. Cl. ..................... 348/510; 348/510; 348/540; 348/441; 348/443; 345/302

[58] Field of Search .................... 348/510, 513, 348/514, 518, 539, 556, 443, 458, 500, 512, 441, 536, 639, 640, 564, 565, 567, 568, 447, 540, 459, 515, 519; 345/302

[56] References Cited

U.S. PATENT DOCUMENTS

| | | | |
|---|---|---|---|
| 4,599,650 | 7/1986 | Wilkinson | 348/518 |
| 4,689,676 | 8/1987 | Nakajima et al. | 348/513 |
| 4,959,718 | 9/1990 | Bennett | 348/518 |
| 5,128,776 | 7/1992 | Scorse et al. | 358/426 |
| 5,426,513 | 6/1995 | Scorse et al. | 358/433 |
| 5,495,293 | 2/1996 | Ishida | 348/500 |
| 5,574,752 | 11/1996 | Juri | 348/513 |
| 5,668,594 | 9/1997 | Cahill, III | 348/512 |
| 5,841,482 | 11/1998 | Wang et al. | 348/512 |

Primary Examiner—John K. Peng
Assistant Examiner—Paulos M. Natnael

[57] ABSTRACT

A process and system for synchronizing a video signal to the sampling period of a client system. The synchronization may be suitably implemented by adding or deleting trailing lines from each frame of video data to adjust the frame to match the sampling period of the client system. The synchronization system minimizes the lag between the time a video signal is delivered to the client system and the time the client system responds. The low lag time enhances the responsiveness of the client system to human inputs, and improves the suitability of the overall system to human use. The synchronization system can be achieved using suitable low-cost hardware and is therefore particularly well suited for video game or virtual reality systems designed for home use, increasing the feasibility of employing video inputs in such systems.

18 Claims, 4 Drawing Sheets

METHOD AND APPARATUS FOR SYNCHRONIZING VIDEO SIGNALS

FIELD OF THE INVENTION

The present invention relates generally to an improved method and apparatus for video signal synchronization. More specifically, the invention relates to a method of synchronizing a video signal to a client device by adjusting the time duration of the video signal to accord with the sampling period of the client device.

BACKGROUND OF THE INVENTION

Video signals are employed by numerous modern devices, such as video game consoles or virtual reality graphics engines, and the like. In the past, video signals were typically employed in a relatively static fashion. Standard television systems, for example, operated statically. A video signal was created in a studio and then transmitted to a remote display device, such as a television console in a viewer's home. More recently, video systems have been developed which operate interactively, accepting inputs from the user. In these interactive devices, such as video games for example, the ultimate video display has been generated in an interactive fashion. Inputs from a user or users are received through electrical input means such as a joystick, keyboard, or other game control device. These inputs are received, processed and employed in the creation of the video output.

For example, a typical video game would generate various representations of objects. Such objects are typically created by a digital processor subject to software control which produces digital representations of the objects which are then converted to video signals and output to a display. The user inputs are often used by the video game device to control the motion of the represented object. These inputs from the user have typically been in the form of electrical impulses and not video signals. Typical prior art video game devices had no need or mechanism for employing true video signals as inputs to influence the operation of the game.

More recently, however, modern video devices more and more frequently employ video input devices such as video cameras, and the signals received from these video cameras, to influence the operation of the device. A modern virtual reality system, for example, may employ a camera fixed on or tracking the user. The camera will create video signals which will then be transmitted to various devices within the virtual reality system. Some of these devices may, for example, incorporate an image of the user into a display containing other computer-generated visual representations. Other devices may interpret various gestures or movements of the user detected by the camera, converting these gestures or movements into game control inputs.

Any such video game or virtual reality system, or any other client system which employs video data as an input in an interactive fashion, requires a flexible, efficient method of video synchronization. Such a method must be adaptable to the requirements of various client systems, and will ideally be adjustable based on commands from the client system.

The synchronization method must also be efficient, providing the video signal to the client at the time it is required by the client. This is important in order to assure smoothness of operation for the system. In a video system, such as a virtual reality system, for example, it is important that the system exhibit a low latency. In other words, the system should respond as instantaneously as possible to an input by the player or user. Lag resulting from system processing requirements or video mismatch is undesirable. A system which responds substantially immediately to the operator will make for better and more precise control by the operator, and will lead to an increased sense of immersion by the operator.

Some video systems of the prior art totally lack synchronization. This lack degrades the performance of the system, as significant lags may exist between the time the client device is ready for the video data and the time the video data is available. Moreover, a lack of synchronization will add complexity to the operation of the system, as the client device will make a variable number of repeated requests for the video data until it finally receives it.

Video synchronization methods and apparatus exist which employ phase-locked loops to synchronize video cameras to synchronization sources. These approaches, however, lock the camera not frame by frame, but line by line and pixel by pixel. Moreover, instead of synchronizing the video data to the requirements of the client device, phase-locked loop synchronization simply locks both the video data and the client device to a reference signal. This approach to synchronization is not suitable for variable timing requirements of client devices. Thus, phase lock loop synchronization techniques present several disadvantages. These include a requirement for additional circuitry to achieve a degree of lock beyond what is required for the purposes of the particular video system, a requirement of a video synchronization signal which includes horizontal and vertical synchronization and color burst features which are not always readily available in environments in which video game systems, for example, are used, and a lack of flexibility, in that a phased-lock loop synchronization cannot easily be adjusted to meet the requirements of various clients, and in particular cannot easily respond to varying requirements of a client. Varying processing loads on a client, for example, may cause the client to vary in the times it is able to receive data, and thus to vary slightly the timing of its data requests.

There exists, therefore, a need in the art for synchronization methods and apparatus which operate flexibly to achieve frame-by-frame synchronization, employ synchronization signals which are readily available, and which are easily adjustable to match the client's timing requirements.

SUMMARY OF THE INVENTION

The present invention addresses problems such as those discussed above by providing a method of frame-by-frame synchronization of video data. In one aspect of the present invention, the time interval in which the client requires the data is detected, and then the duration of the data is adjusted to fit into that time interval. Another aspect of the present invention is a video synchronization system which operates in a video system and delivers video data to a client. The synchronization system passes frames of video data from an image processing system to a client system. The synchronization system detects the point, or peek time within the transmission of each frame of video data at which a video data request is received by the client system. The synchronization system compares this actual detected peek time with a desired peek time, and for each frame of video data adjusts the time duration of the frame of video data so that the actual peek time matches the desired "peek" time. This is done by adding or subtracting an appropriate number of trailing blank video lines to each frame. The synchronization system of the present invention continuously updates the peek time, enabling it to adapt quickly to variations in the behavior of the client system.

A more complete understanding of the present invention, as well as further features and advantages of the invention, will be apparent from the following Detailed Description and the accompanying drawings.

DETAILED DESCRIPTION

Figure 1:
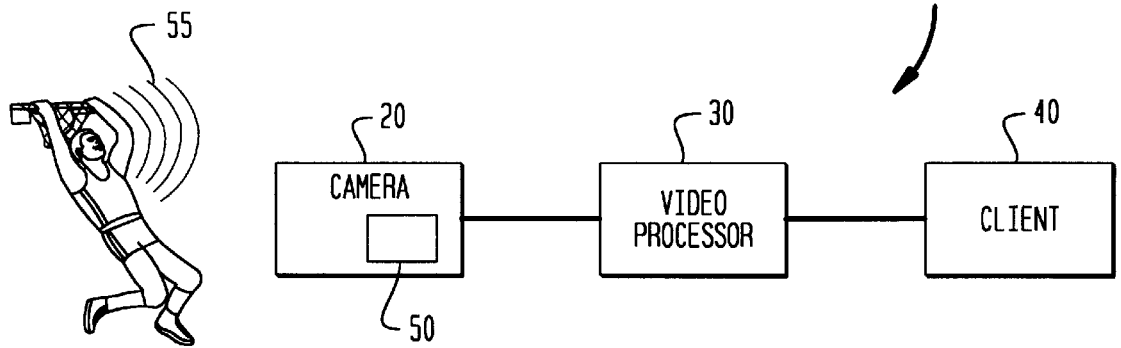
FIG. 1 illustrates a block diagram of a game system which might suitably employ the present invention.

The present invention provides a method and apparatus which is preferably intended for use in a video system, such as the video system 10 of FIG. 1. Video system 10 will typically include a camera 20, a video processor 30, and a client system or device 40, such as a video game controller. Camera 20 will typically contain an image sensor 50. Video processor 30 receives video signals from camera 20, processes the video signals and provides them on command to client system 40. Client system 40 may then employ the video signals in any of a variety of uses, such as to incorporate an image of a user 55 into a game scene, or to recognize various movements or gestures of the user 55 and to translate these movements or gestures into signals controlling various aspects of a video game or virtual reality system.

In order to provide smooth and precise operation and to provide a user with a sense of immersion, the video system 10 must exhibit a low latency, or lag time, between the time a user makes an input and the time the video system 10 responds. Latency depends on a number of factors, some of which can be controlled by the design of the video system 10. These include the exposure time of camera 20, the readout time of image sensor 50, the processing time of video processor 30, the processing time of client 40, and the synchronization time between video processor 30 and client system 40.

Exposure time can be minimized by maintaining a short sampling time, but the minimum exposure time is limited by factors such as the available light and the sensor sensitivity of the image sensor. It is possible to achieve a short exposure time by brightly illuminating the subject, but this requirement limits the versatility of the system. Likewise, a short exposure time may be achieved by employing a highly sensitive sensor, but such sensors tend to be more expensive. The readout time of image sensor 50 is typically fixed at 60 frames per second, or 1 frame per 1/60 second for NTSC-standard video systems. The processing time of the video processor 30 and client system 40 depend on the overall design of video system 10. The processing time of the video processor 30 and client system 40 can be minimized by choosing fast, powerful hardware, but this increases the cost of the system. Where it is contemplated that a video system using interactive video sensing will be employed in a video game system for use in the home, minimizing cost is important. The synchronization of the video processor 30 and the client system 40, which is achieved by the present invention allows for minimization of latency with a minimum of cost and complexity, and a minimum of high-priced circuitry.

Numerous modern embodiments of cameras suitable for use as the camera 20 operate according to the NTSC-standard, and prepare and transmit NTSC-standard video signals. NTSC-standard video signals are provided in frames. Each frame consists of an array of horizontal lines of pixels, which are displayed by scanning the frame vertically from top to bottom. An image sensor such as the image sensor 50 contained in the camera 20 will provide a frame such as the one illustrated in FIG. 2.

Figure 2:
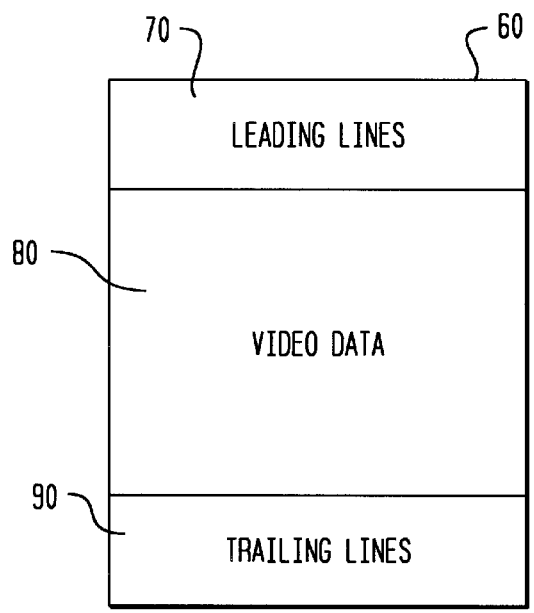
FIG. 2 is a diagram of a typical frame of video data, illustrating the leading and trailing blank lines in the frame.

FIG. 2 generally illustrates a typical frame 60 of NTSC-standard video data, consisting of an array of horizontal lines of pixels. Frame 60 may be organized into leading lines 70, video data 80, and trailing lines 90. The synchronization method of the present invention operates by adding or deleting a number of trailing lines 90 from video frame 60. As discussed in greater detail below, the present invention preferably adds or deletes trailing lines in order to avoid adversely affecting the timing or the content of video frame 60. In an NTSC-standard video frame, the leading lines 70 are important to establishing the timing of video frame 60. Adding or subtracting lines from video data 80 would naturally alter the visual content of video frame 60. Trailing lines 90, by contrast, merely occupy time. The synchronization method of the present invention, by adding or subtracting trailing lines 90, leaves the timing and content of video frame 60 unaffected, except for adjusting the time duration of video frame 60 to synchronize with the requirements of client system 40.

As discussed further below, the synchronization method of the present invention adds or deletes lines to a video frame, such as the video frame 60 of FIG. 2, in order to regulate the width, or in other words, the time duration, of the video frame 60. The present invention does not introduce a new reference standard, such as might be employed with a phase-locked loop, to which the operation of video processor 30 and client system 40 must adhere. Instead, the present invention simply varies an already present characteristic of the video frame 60 in conformity with the possibly varying requirements of the client system 40. As will be seen in the discussion of FIG. 3 below, the present invention allows the width of video frame 60 to be continuously varied in accordance with such varying requirements. Thus, the present invention provides a highly flexible and cost effective approach to providing synchronization.

Figure 3:
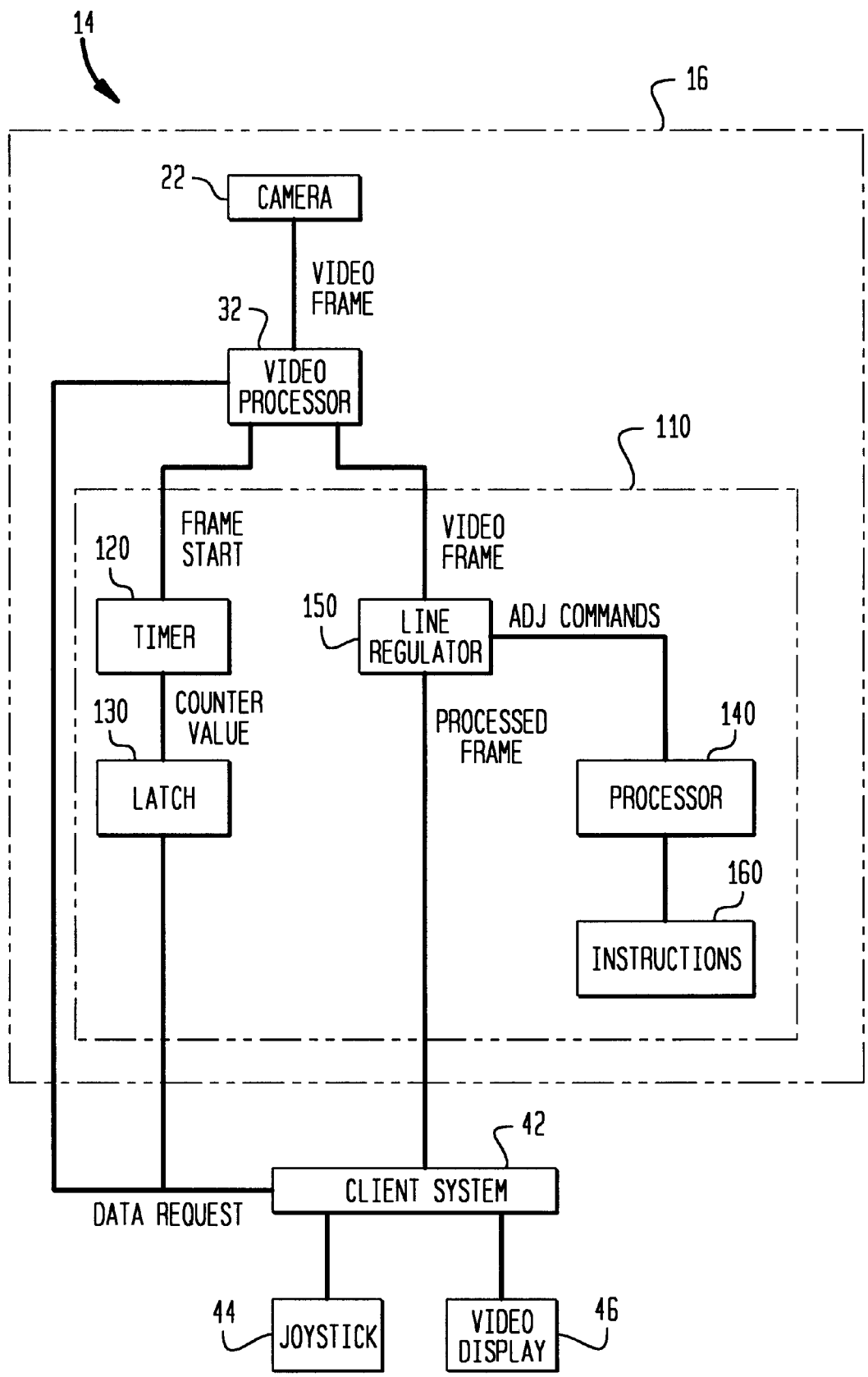
FIG. 3 is a block diagram of a video system employing a synchronization system in accordance with the present invention.

FIG. 3 illustrates a video game system 14 employing a synchronization system 110 according to a presently preferred embodiment of the present invention. Video game system 14 employs an image processing system 16 consisting of a camera 22, a video processor 32, and a synchronization system 110. Image processing system 16 delivers processed video frames to a client system 42. The client system 42 may also receive inputs from an input such as joystick 44, a keyboard or any other control input, and drives a video display 46, as is typical of many standard video game systems. The synchronization of the image processing system 16 with the client system 42 achieved by the synchronization system 110 allows the image processing system 16 considerable flexibility in design and operation. Unlike a phase-locked loop synchronization system, which is constrained to operate in lock step with a reference signal, image processing system 16 is under no such constraint, and can be designed to operate in an optimum phase with client system 42. For example, if client system 42 is a video display system, image processing system 16 preferably operates during the video retrace cycle of client system 42. Image processing system 16 thus operates to capture and prepare the next frame of video data after client system 42 has finished displaying the previous frame and is recycling in order to prepare to display the next frame. Thus, video system 14 operates while client system 42 is not actively displaying data, and while any video display driven by client system 42 is dark.

That the image processing system 16 can be set to operate during the video retrace cycle of client system 42 is advantageous for several reasons. If the video display 46 driven by client system 42 is a typical NTSC-standard video display, the display will flicker at 60 Hz due to the raster-scanned nature of the video display 46. The video display 46 will produce light which may be picked up by the camera 22. An image processing system of the prior art would be subject to operating asynchronously with the video display, and would thus perceive a flicker due to the beat frequency between the image processing system and the video display. Such a flicker would interfere with processing of the image by the video processor. When image processing system 16 of the present invention is synchronized with client system 42, no flicker exists since there is no beat frequency between the image processing system 16 and the client system 42. Thus, in such a system, the image processing system 16 is preferably set to operate during the video retrace cycle of the client system 42. No flicker is then possible, because the video display 46 is dark during the operation of the image processing system 16. Therefore, the video display 46 is emitting no light for camera 22 to sense during any period in which camera 22 is sensing data for active transmission.

The synchronization system 110 is employed by the video game system 14 to provide synchronization between the video processor 32 and the client system 42. The video processor 32 receives video frames from the camera 22 and supplies the video frames one at a time to the synchronization system 110. The synchronization system 110 operates by regulating the number of horizontal lines of pixels in each frame of video data supplied to the client system 42. A typical NTSC-standard frame of video data consists of 262.5 lines, organized into leading lines, video data, and trailing lines, as discussed above in connection with the discussion of FIG. 2. A frame can, however, consist of anywhere from a minimum of 254 lines to 385 lines, though normally a frame is limited to a maximum of 270 lines. The synchronization system 110 adds or deletes trailing lines from each frame of video data so that the duration of each frame matches the sampling period of the client system 42.

Synchronization system 110 may suitably consist of a timer 120, a latch 130, a processor 140 and a line regulator 150. The processor 140 operates under the control of a program or instruction set 160. The instruction set 160 will be discussed in greater detail below in conjunction with the discussion of FIG. 4. As synchronization system 110 begins receiving each video frame from the video processor 32, timer 120 is reset and started. This may be done, for example, by the video processor 32 sending a Frame Start signal to the timer 120. When client system 42 sends a data request to image processing system 16, this request may be sent to the video processor 32 to trigger the transmission of a video frame, and simultaneously to latch 130 to trigger the storage in latch 130 of the value of the timer 120. The value stored in the latch 130 will be referred to as the "peek" time, and it records the point in the video frame at which the previous video frame was used by client 42. This peek time is compared by processor 140 with a desired peek time which is either predetermined and stored in processor 140 or else computed by the processor 140 based on performance characteristics of the video processor 32. The difference between the actual peek time and the desired peek time is used by the processor 140 in preparing the next video frame for client system 42. Using the value of the peek time stored in the latch 130, processor 140 performs further processing, under the control of the instruction set 160. Processor 140 determines the number of lines that should be added to or subtracted from the video frame received from video processor 32 by synchronization system 110. Processor 140 then sends adjustment commands to line regulator 150 instructing the line regulator 150 to add or subtract the correct number of lines from the video frame. Line regulator 150 then adds or subtracts the appropriate number of lines and sends the processed video frame to the client system 42.

It can be seen from the above discussion that with every new video frame, synchronization system 110 updates the actual peek time associated with the client system 42. The difference between the actual peek time and the desired peek time indicates the adjustment needed to the video frame. By continuously receiving new values for the peek time, the synchronization system 110 is thus able to respond quickly to changes in the timing requirements of client system 42, responding to these changes typically within a few video frames. Synchronization system 110 is therefore able to maintain a smooth synchronization and a corresponding low latency even in the face of variations in the sampling period of client system 42. While the above discussion is framed in terms of continuous updating, it will be recognized that the updates may be made periodically, such as every four frames, or that updating may occur if a timing error in excess of a predetermined limit is detected.

Figure 4A:
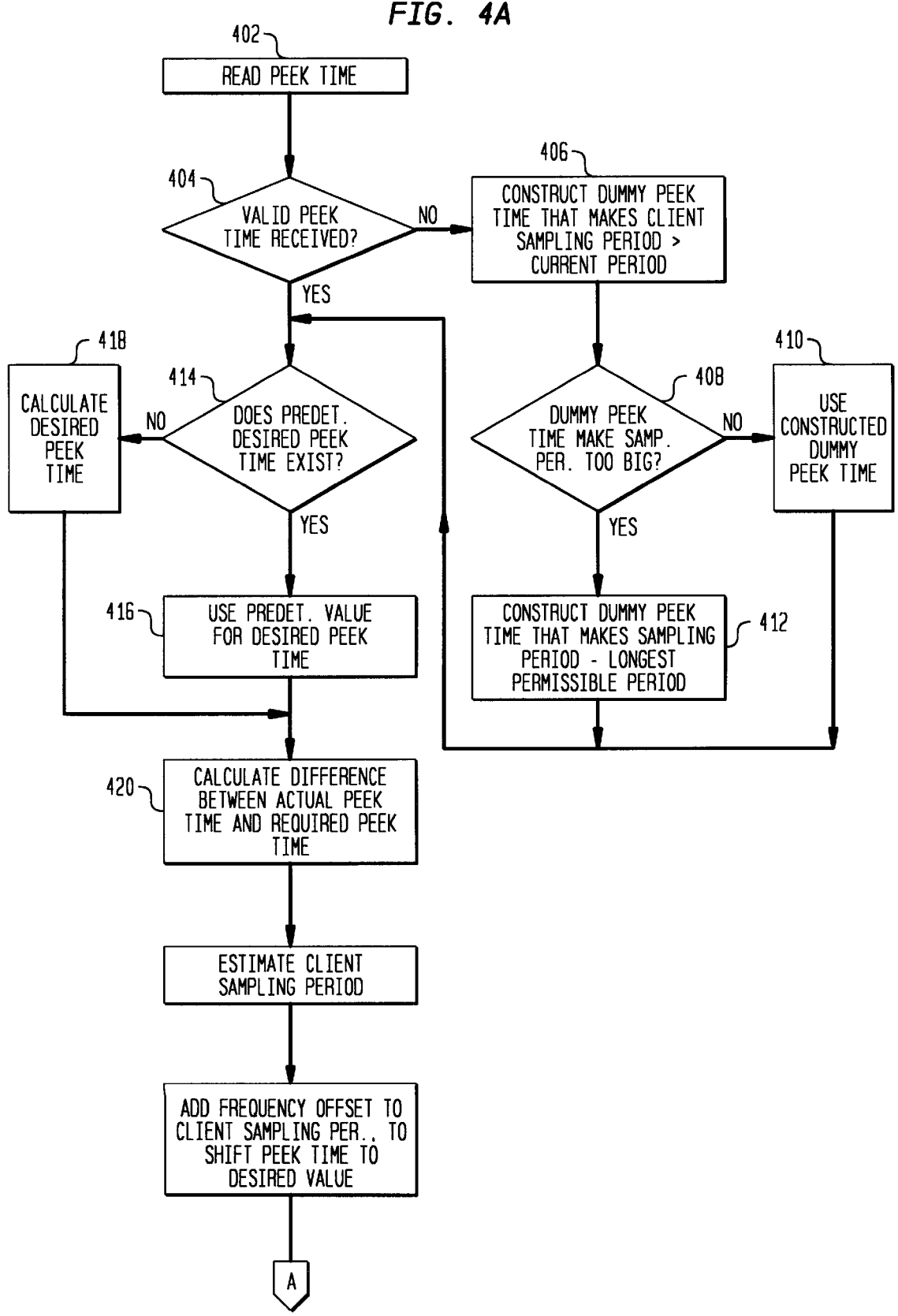
FIGS. 4A and 4B show a flowchart illustrating the sequence of steps followed in one embodiment of a method in accordance with the present invention.
Figure 4B:
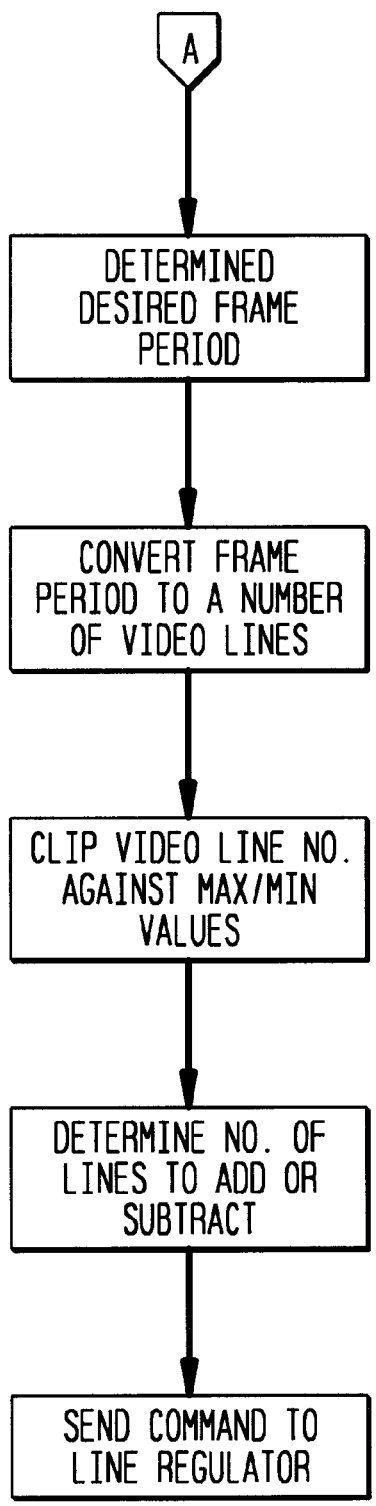

FIGS. 4A and 4B show a flowchart describing in further detail the functions that may preferably be performed by processor 140 under the control of the instruction set 160. Processor 140 operates on each frame of video data to be supplied to client system 42. In block 402, processor 140 reads the peek time from latch 130. In block 404, the peek time received from latch 130 is evaluated for validity. If a valid peek time was not received, control is transferred to block 406. In block 406, a dummy peek time is constructed which will make the sampling period of the client system 42 longer than the current sampling period. Next, in block 408, the dummy peek time constructed in block 406 is evaluated for validity. The dummy peek time is not valid if it would make the sampling period of client system 42 longer than the longest permissible sampling period. This may occur at startup or at other times when client system 42 has not yet received any video data. If the constructed dummy peek time is invalid, control is transferred to block 412 and a new dummy peek time is used which makes the sampling period equal to the longest permissible sampling period. This period is typically the duration of a frame of 270 video lines.

If, on the other hand, the dummy peek time constructed in block 406 is valid, control is transferred to block 410 and the dummy peek time constructed in block 406 is used. If a valid peek time was received in block 402, control is transferred directly from block 404 to block 414 and the actual peek time received in block 402 is used.

The above mentioned peek times are used for comparison with the desired peek time as described further below. In block 414, the processor 140 determines if a predetermined value exists for the desired peek time. If no predetermined value exists, control is transferred to block 418 and a value for the desired peek time is calculated based on the average time at which video processor 30 completes processing, plus a fixed allowance for variability. Next, control is transferred to block 420. The difference between the actual peek time, or the constructed dummy peek time, if one is used, and the desired peek time is calculated. In block 422, the sampling period of client system 42 is estimated. In block 424, a frequency offset is calculated which, when added to the client sampling period, will shift the actual peek time to the desired value. Over the course of several frames, this shifting step will cause the actual peek time to converge on the desired peek time. The frequency offset thus calculated is then added to the client sampling period. In block 426, a desired frame period is calculated which matches the desired sampling period for the client system 42. Next, in block 428, the desired frame period is converted to a number of video lines. This is done, for example, by dividing the frame period by the average duration of a video line. The value thus obtained is then rounded to the next closest integer, to yield an integral number of video lines.

In block 430 the number yielded from the calculation in block 428 is clipped. That is, it is compared against the minimum and maximum allowable number of lines for a frame of video data. If the number from block 428 is greater than the maximum allowable number, the maximum number is used. If the number from block 428 is less than the minimum allowable number, then the minimum number is used. If the number from block 428 is within the allowable range, then the number from block 428 is used. In block 432, the number chosen in block 430 is used to determine how many lines should be added to or subtracted from the next frame of video data coming from the video processor 32. In block 432, a number is calculated which will add or subtract a proper number of lines from the video frame delivered from the video processor 32, to make the total number match the number calculated in block 430. Finally, in block 434, processor 140 sends an adjustment command to line regulator 150 to cause line regulator 150 to add or subtract the appropriate number of lines and send the adjusted video frame to client system 40.

While the present invention is disclosed in the context of a presently preferred embodiment, it will be recognized that a wide variety of implementations may be employed by persons of ordinary skill in the art consistent with the above discussion and the claims which follow below.

I claim:

1. A method for synchronizing video signals provided from a video source to a client system having variable timing requirements, comprising the steps of:

receiving a frame of video data from the video source, said frame having a duration;

computing a desired duration of said frame to match the variable timing requirements of the client system, wherein the step of computing said desired duration of said frame of video data includes determining a matching duration necessary to match a sampling period of the client system; and adjusting said duration of said frame by an amount necessary to achieve said desired duration.

2. The method of claim 1 wherein said frame of video data consists of a vertical array of horizontal lines of pixels.

3. The method of claim 2 wherein said frame of video data comprises, a number of leading horizontal lines of pixels, a number of horizontal lines of pixels containing video data, and a number of trailing horizontal lines of pixels.

4. The method of claim 3 wherein the step of computing said desired duration of said frame of video data consists of computing a desired number of horizontal lines of pixels of which said frame should consist in order to give it said desired time duration.

5. The method of claim 4 wherein the step of adjusting said duration of said frame of video data by a desired amount includes adding or deleting a sufficient number of horizontal lines of pixels to said frame to make said frame of video data consist of said desired number of horizontal lines of pixels.

6. The method of claim 5 wherein said horizontal lines of pixels which are added or deleted from said frame of video data are trailing horizontal lines of pixels.

7. The method of claim 5 wherein the step of computing said desired duration of said frame of video data also includes clipping said computed number of horizontal lines of pixels against predetermined maximum and minimum numbers of horizontal lines of pixels of which said frame of video data is allowed to consist.

8. A method for synchronizing video data to match the sampling period of a client system, comprising the steps of:

receiving a frame of video data;

starting a timer at a beginning of a reception of said frame of video data;

receiving, during said reception of said frame of video data, a data request from said client system;

storing, upon a reception of said data request from said client system, a value of said timer, said value of said timer being an actual peek time representing a point in said frame of video data at which said request was received from said client device;

determining a desired peek time, said desired peek time representing a desired point in said frame of video data at which it is desired that said data request from said client system should be received;

estimating a sampling period of said client system;

computing a desired duration of said frame of video data, said duration being a sum of said client sampling period and an additional term such that when said term is added to said client sampling period said actual peek time will be said desired peek time;

converting said desired duration of said frame of video data to a number of horizontal lines of pixels, said number being a number of horizontal lines of pixels necessary to make said frame of video data of said desired duration, said number of horizontal lines of pixels being the quotient of said desired duration of said frame of video data divided by the duration of one horizontal line of pixels, said quotient being rounded to a next closest integer;

computing a number of horizontal lines of pixels to be added to or deleted from said received frame of video data in order to make said received frame of video data contain said desired number of horizontal lines of pixels; and adding or deleting said computed number of horizontal lines of pixels to said frame of video data.

9. The method of claim 8 wherein if no valid peek time is received, a dummy peek time is constructed which will make a future client sampling period longer than said client sampling period.

10. The method of claim 9 wherein said dummy peek time is evaluated to determine if it will make said future client sampling period longer than a maximum allowable value, and, if so, a dummy peek time is constructed which will make said future client sampling period equal to said maximum allowable value.

11. The method of claim 9 wherein said desired number of horizontal lines of pixels is clipped against a maximum and minimum number of lines which a frame of video data may contain.

12. A system for synchronizing a frame of video data with a client system, comprising:

a timer for measuring a sampling period of said client system;

a processor for:
(i) receiving said frame of video data;
(ii) detecting a duration of said frame of video data:
(iii) computing a desired duration of said frame of video data necessary to make said duration of said frame of video data match said sampling period of said client system by computing a required number of video lines of which said frame of video data should consist in order to make said frame of video data of said desired duration;
(iv) computing an adjustment necessary to make said frame of video data of said desired duration; and an adjuster, controlled by said processor, for adjusting said duration of said frame of video data to match said sampling period of said client system.

13. The synchronization system of claim 12 wherein said processor also clips said required number of video lines against a maximum and minimum number of video lines of which said frame of video data is allowed to consist.

14. The synchronization system of claim 13 wherein said processor also computes an adjustment number of video lines to be added or subtracted from said frame of video data in order to make it consist of said required number of video lines.

15. The synchronization system of claim 14 wherein said adjuster adjusts said duration of said frame of video data by adding or subtracting said adjustment number of video lines from said frame of video data.

16. The synchronization system of claim 15 wherein said system is employed to synchronize visual signals employed as inputs of a video game system.

17. A method for synchronizing on an ongoing basis video signals provided from a video source to a client system having variable timing requirements, comprising the steps of:

receiving a frame of video data from the video source, said frame having a duration;

computing a desired duration of said frame to match the variable timing requirements of the client system by comparing an actual peek time with a desired peek time;

adjusting said duration of said frame by an amount necessary to achieve said desired duration; and repeating said steps for a subsequent frame thereby enabling rapid adaptation to variations in the timing requirements of the client system.

18. A system for synchronizing on an ongoing basis a frame of video data with a client system having variable timing, comprising:

a timer for measuring a sampling period of said client system;

a processor for:
(i) receiving said frame of video data;
(ii) detecting a duration of said frame of video data;
(iii) computing a desired duration of said frame of video data necessary to make said duration of said frame of video data match said sampling period of said client system;
(iv) computing an adjustment necessary to make said frame of video data of said desired duration by comparing said detected duration with said computed desired duration; and an adjuster, controlled by said processor, for adjusting said duration of said frame of video data to match said sampling period of said client system.

* * * * *